Dec. 9, 1941.  B. E. SHAW  2,265,495
THERMOSTAT
Filed Dec. 6, 1939
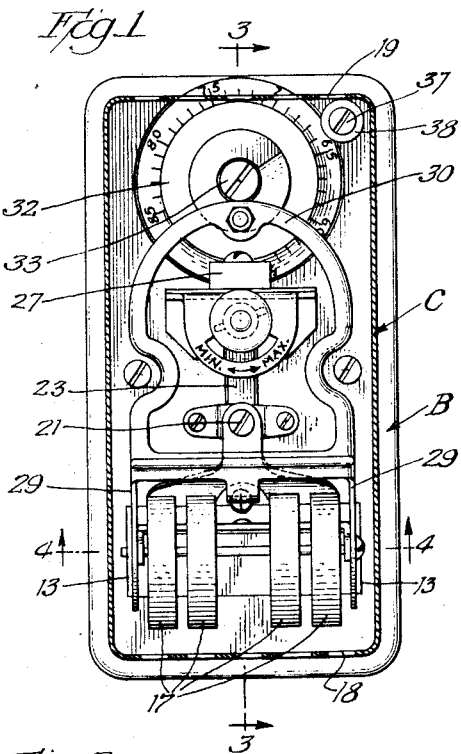
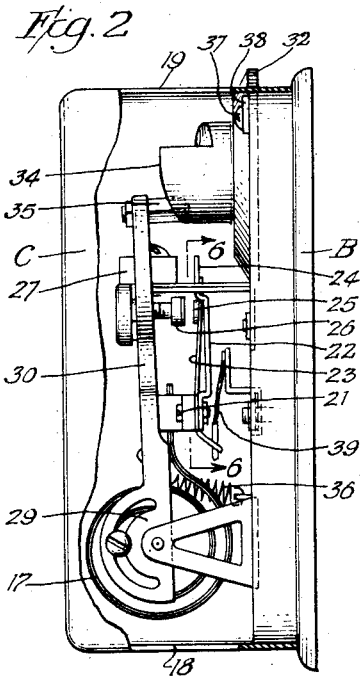
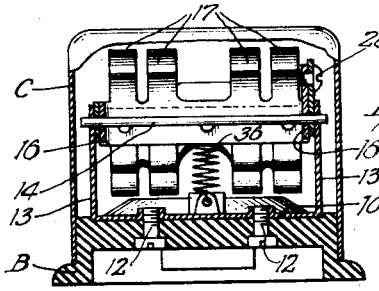
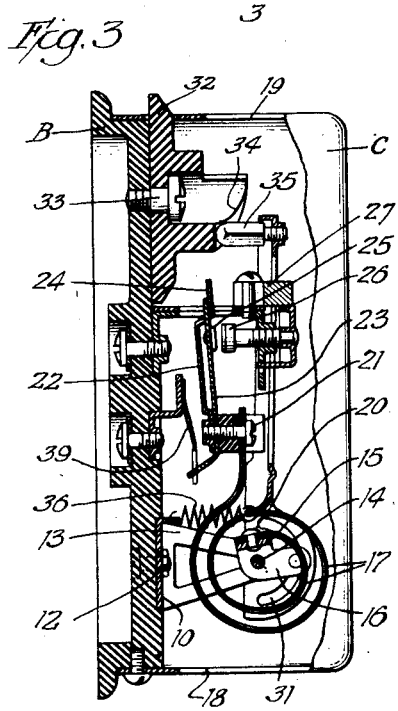
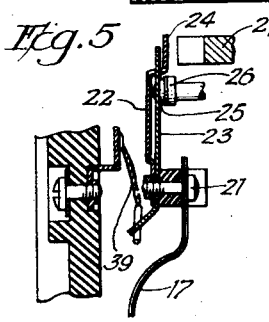
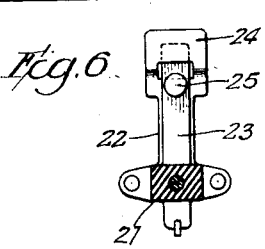
Inventor
Burton E. Shaw
BY
Bair & Freeman
Attorneys Patented Dec. 9, 1941

2,265,495

UNITED STATES PATENT OFFICE 2,265,495

THERMOSTAT

Burton E. Shaw, Bristol, Ind., assignor to Penn Electric Switch Co., Goshen, Ind., a corporation of Iowa Application December 6, 1939, Serial No. 307,827

10 Claims. (Cl. 200—139)

My present invention relates to a thermostat such as a "room thermostat" particularly designed for "line voltage operation" of oil burners and other devices wherein the motors are of considerable capacity, for instance, one horse power.

One object of the present invention is to provide a thermostat which can efficiently control line voltage or voltages of 110 or 200 where considerable current as required for a one horse power motor passes through the contacts of the switch and thereby produces considerable heat due to the resistance of the contacts, contact leaves, pigtail connections, etc. The arrangement in my thermostat being such that the heat generating elements thereof are located above the temperature responsive element whereby upward drift of air through the casing of the thermostat as caused by the generation of heat carries away such generated heat without any possibility of it affecting the operation of the temperature responsive element itself.

More particularly it is my object to provide a thermostat in which a rugged bimetal element is designed for quick response to temperature changes and located adjacent the bottom of the thermostat casing where incoming air will strike before the temperature of such air is modified by picking up heat from the switch contacts and other current carrying elements of the thermostat.

Another object is to provide means for adjusting the temperature responsive element at the bottom of the base by an adjusting means which is located adjacent the top thereof where it can be conveniently and readily adjusted and its indicating characters easily read.

Still another object is to provide switch contacts which are particularly adapted for a snap action thermostat of the kind embodying my invention.

With the foregoing and other contemplated as well as obvious objects in view, my invention comprises the combination of elements and arrangements of parts thereof such as to coact and cooperate with each other in the performance of the functions and the accomplishment of the results herein contemplated. My thermostat comprises in one of its adaptations the species or preferred form illustrated in the accompanying drawing, wherein:

Figure 1 is a front elevation of a switch structure embodying my invention with the casing thereof shown in section.

Figure 2 is a side elevation with a portion of the casing broken away and other portions thereof shown in section.

Figure 3 is a sectional view on the line 3—3 of Figure 1 showing the switch in open position.

Figure 4 is a sectional view on the line 4—4 of Figure 1.

Figure 5 is a sectional view similar to a portion of Figure 3 showing the switch contacts in closed position; and Figure 6 is a sectional view on the line 6—6 of Figure 2 showing details of the contact carried by the switch arm.

On the accompanying drawing I have used the reference character B to indicate generally a base and C a casing. The base B is preferably formed of insulating material and is adapted to be mounted in an upright position as illustrated in Figures 2 and 3 on a vertical wall surface or the like.

A U-shaped bracket 10 is secured to the base B adjacent the lower end thereof as by screws 12. The bracket 10 has a pair of outstanding arms 13 supporting a pivot shaft 14. A mounting bracket is pivoted on the shaft 14 and it also is U-shaped. The mounting bracket has a cross piece 15 and a pair of arms 16.

A coiled bimetal element 17 is provided and it is formed in four sections as illustrated in Figures 1 and 4 with open spaces between the sections for free flow of air past all parts of the bimetal element. The casing C has inlet openings 18 and outlet openings 19 in the bottom and top walls respectively thereof to permit such flow of air.

One end of the bimetal element 17 is secured as by rivets 20 to the cross piece 15 of the mounting bracket. The other end is secured as by screws 21 to a switch arm 22. The switch arm 22 carries a leaf spring 23 normally assuming the position shown in Figure 3 against a stop flange 24 of the switch arm. The spring 23 carries a contact 25 for engagement with a stationary contact 26. The member 24 constitutes an armature coacting with a magnet 27 to produce snap action of the switch.

The right hand arm 16 in Figures 1 and 4 is connected by a clamp screw 28 to the right hand arm 29 of a yoke having a cross piece 30. The yoke has two of the arms 29 which are pivoted on the shaft 14. The right hand arm 29 is provided with an arcuate slot 31 for the clamp screw 28.

The cross piece 30 of the yoke may be adjusted toward or away from the base B to therefore change the range of operation of the bimetal 17. To accomplish this purpose, an adjusting disc 32 is provided pivoted on a screw 33. The disc 32 has a cam face 34 contacting with a transversing element 35 screwed into the cross piece 30 of the yoke. The transversing element is held against the cam face 34 by a spring 36.

*Practical operation*

In the operation of my switch structure, the contact 25 is normally spaced from the contact 26 as in Figure 3 as a result of a sufficiently high temperature in the room. As the temperature recedes, the armature 24 will move closer to the magnet 27 as a result of coiling up of the bimetal element 17. Finally the contacts will become engaged as in Figure 5.

As the temperature rises again due to operation of the burner, the bimetal element 17 will uncoil and as soon as the energy stored therein is sufficient to overcome the pull of the magnet 27 on the armature 24, it will move the armature in a direction away from the magnet. As the armature is immediately in a weaker magnetic field, its movement will increase as the stored up energy in the bimetal has greater effect on it. This will produce sufficient momentum by the time the armature strikes the leaf spring 23 that it will quickly separate the contact 25 from the contact 26 to minimize arcing.

The range of operation of the bimetal element 17 can be readily adjusted by turning the disc 32 as desired. The disc is provided with indicating characters as shown in Figure 1 to indicate the range to which the thermostat is adjusted. After adjustment is made, a screw 37 (see Figure 1) may be tightened against a washer 38 which in turn clamps disc 32 to prevent further unauthorized adjustmnet thereof.

The sections of the bimetal element 17 being separated from each other provides sufficient space between them for free flow of air so that the bimetal element is quickly responsive to any changes of temperature of the air. The air drifts upwardly through the casing C because heat is generated in the casing by current passing through the contacts 25 and 26 and the associated pigtail connection 39 and various brackets and terminals of the switch. This induces a circulation of air thermally and by locating the contacts, etc. above the bimetal element any heat caused by passage of heat therethrough is dissipated upwardly away from the bimetal element and therefore does not in any way modify the response of the element 17 to ambient temperature.

The yoke arrangement 29—30 makes it possible to adjust the bimetal element at the lower end of the base from a position at the upper end thereof. This is desirable because the indicating characters on the adjusting disc 32 are at the top of the casing C where they are much more easily readable than if they are located adjacent the bottom of the casing. This is particularly true in present day installations where thermostats are mounted with their upper ends at or somewhat below eye level.

I also provide coarse and fine factory adjustments consisting of the clamp screws 38 and the transversing element 35 respectively. After the room thermostat has been heated and cooled for a number of times so as to temper and condition the bimetal element 17, the clamp screw 28 may be reset to approximately the proper position for the bimetal element to be adjusted in accordance with the scale on the disc 32. The element 35 threaded into the yoke can then be used as a fine adjustment to secure maximum accuracy.

Having described a specific embodiment of my invention and also the operation thereof, I desire it to be understood that this form has been selected merely for the purpose of limiting the number of forms which my thermostat may assume. It is to be further understood that various modifications, adaptations and alterations may be applied to the specific form disclosed to meet the requirements of practice without in any manner departing from the spirit and scope of the present invention except as set forth in the claims appended hereto.

Having thus described my invention I desire to secure by Letters Patent of the United States:

1. In a thermostat, a base adapted to be mounted on a substantially vertical wall, a coiled bimetal element thereon adjacent the lower end thereof, said bimetal element extending across substantially the width of the base, being arranged with its axis horizontal and parallel to said base and being formed of sections with open spaces between the sections to permit free flow of air around each section thereof, a switch arm operated by said bimetal element, contacts controlled by said switch arm and located above the bimetal element whereby heat resulting from passage of current through said contacts is carried upwardly away from said bimetal element by thermal circulation and means at the top of said base for changing and indicating the range setting of said bimetal element, said means comprising a cam, a yoke connected with said bimetal element to change the position thereof, said yoke extending upwardly past said contacts and having a terminal end engaging the cam surface of said cam, said cam surface, upon the position thereof being changed, effecting movement of said terminal end toward or away from said base.

2. A thermostat comprising a base adapted to be mounted in a vertical position on a wall or the like, a coiled bimetal element supported on said base adjacent the lower end thereof and being arranged with its axis horizontal and substantially parallel to said base, said bimetal element being formed of sections with open spaces between them to permit free drift or air past each section thereof and to thereby be substantially immediately responsive to the temperature of such air, a switch arm carried by said bimetal element, a contact carried thereby and movable within predetermined limits relative thereto, a stationary contact for engagement by said first mentioned contact, said first mentioned contact being normally biased to one of its limits and movable to its other limit upon such engagement occurring, magnetic snap action means associated with said switch arm, said contacts being located above said bimetal element whereby heat therefrom is dissipated upwardly therefrom by the drift of air past said bimetal element and contacts, a casing enclosing said bimetal element and contacts and having openings adjacent the bottom and top thereof to permit passage of such air and range adjusting means including an indicator, said range adjusting means being located adjacent the top of said casing and said indicator being also associated therewith adjacent the top of said casing.

3. A thermostat of the character disclosed comprising a base adapted for mounting in an upright position, a U-shaped bracket on said base adjacent the lower end thereof, a pivot shaft carried by said bracket, a mounting bracket pivoted on said shaft, a coiled bimetal element having one end connected with said mounting bracket, switch contacts operated by the free end thereof, said switch contacts being located above said bimetal element, an adjusting yoke for said bimetal element and pivoted on said shaft, an arcuate slot and clamping screw means of connection between said mounting bracket and said yoke, said yoke passing around the sides of said contacts and terminating thereabove, an adjusting cam above said contacts and rotatable on said base for coaction with said yoke, the upper end of said yoke including a screw threaded traversing element engageable with the cam surface of said cam and spring means for urging said yoke toward position with said transversing element engaging said cam surface.

4. A thermostat of the character disclosed comprising a base, a bimetal element mounted thereon, switch contacts operated by said bimetal element, said switch contacts being located above said bimetal element and outstanding from said base, an adjusting yoke for said bimetal element, said yoke passing around the sides of said contacts and terminating thereabove, and an adjusting cam above said contacts and rotatable on said base for coaction with said yoke.

5. A thermostat of the character disclosed comprising a base adapted for mounting in an upright position, a bracket on said base adjacent the lower end thereof, a pivot shaft carried by said bracket, a mounting bracket pivoted on said shaft, a coiled bimetal element having one end connected with said mounting bracket and switch contacts operated by the free end thereof, said switch contacts being located above said bimetal element, an adjusting arm for said bimetal element and pivoted on said shaft, arcuate slot and clamping screw means of connection between said mounting bracket and said arm, said arm passing said contacts and terminating thereabove, an adjusting cam above said contact and rotatable on said base for coaction with said arm and spring means for urging said arm toward position engaging said adjusting cam.

6. In a thermostat, a base, a shaft supported thereon, a U-shaped mounting bracket having its arms pivoted on said shaft, a coiled bimetal element having one end anchored to said cross piece of said mounting bracket, switch contacts mounted above said bimetal element and controlled by the other end of said bimetal element, a yoke having its arms extending around opposite sides of said switch contacts and pivoted to said shaft and its cross piece located above said contacts, said yoke being connected with said U-shaped mounting bracket and cam means at the upper end of said base coacting with said yoke to adjust it toward and away from said base.

7. In a thermostat, a base, a U-shaped bracket secured thereto adjacent the bottom thereof, a shaft supported by the arms of said U-shaped bracket, a U-shaped mounting bracket having its arms pivoted on said shaft, the cross piece of said mounting bracket being of substantial extent relative to the width of said base, a coiled bimetal element likewise of substantial width having one end connected with said cross piece of said mounting bracket, switch contacts mounted above said bimetal element and controlled by the other end of said bimetal element, the coils of said bimetal element being separated into sections with open spaces between them to permit free air flow past all parts of the bimetal element, a yoke having its arms pivoted to said shaft and its cross piece located above said contacts, said yoke being connected with said mounting bracket whereby to change the position of said bimetal element by rocking of said yoke on said shaft and cam means at the upper end of said base coacting with said cross piece of said yoke to effect such change in position of said bimetal element.

8. A thermostat comprising a base, a coiled bimetal element of substantial width relative to said base, having one end pivotally mounted thereon, switch contacts mounted above said bimetal element and controlled by the other end thereof, an arm pivoted on said base and operatively connected with said bimetal element by means of an arcuate slot and clamping screw and cam means at the upper end of said base coacting with said arm to effect movement thereof and thereby a change in the position of said bimetal element.

9. In a thermostat, a base adapted to be mounted on a substantially vertical wall, a coiled bimetal element thereon adjacent the lower end thereof, said bimetal element being arranged with its axis substantially parallel to said base, a switch arm operated by said bimetal element, contacts controlled by said switch arm, and means at the top of said base for changing and indicating the range setting of said bimetal element, said means comprising a cam, a yoke connected with said bimetal element to change the position thereof, said yoke extending upwardly past said contacts and having a terminal end engaging the cam surface of said cam, said cam surface, upon the position thereof being changed, effecting movement of said terminal end toward or away from said base.

10. A thermostat comprising a base adapted to be mounted in a vertical position on a wall or the like, a coiled bimetal element supported on said base adjacent the lower end thereof and being arranged with its axis horizontal and substantially parallel to said base, a switch arm carried by said bimetal element, a contact carried thereby and movable within predetermined limits relative thereto, a stationary contact for engagement by said first mentioned contact, said first mentioned contact being normally biased to one of its limits and movable to its other limit upon such engagement occurring, magnetic snap action means associated with said switch arm, said contacts being located above said bimetal element whereby heat therefrom is dissipated upwardly therefrom by the drift of air past said bimetal element and contacts, a casing enclosing said bimetal element and contacts and having openings adjacent the bottom and top thereof to permit passage of such air and range adjusting means including an indicator, said range adjusting means being located adjacent the top of said casing and said indicator being also associated therewith adjacent the top of said casing.

BURTON E. SHAW.